Patented Sept. 18, 1951

2,568,579

UNITED STATES PATENT OFFICE 2,568,579

ALDEHYDE-AMINES AND PREPARATION THEREOF

Gerald H. Coleman, Freeland, Mich., assignor to The Dow Chemical Company, Midland, Mich., a corporation of Delaware No Drawing. Application February 16, 1949, Serial No. 76,859

9 Claims. (Cl. 260—566)

This invention relates to a group of new compounds which are the condensation products of primary monoamines or diamines with chloroethoxy aromatic aldehydes having the formula $$Cl-(CH_2-CH_2-O)_n-R-CHO$$

in which R represents an aromatic residue of the benzene series and $n$ is an integer from 1 to 3, and to a method for the preparation of such compounds. The new compounds are thus of the type known generally as Schiff's bases. They are characterized by the generic formula $$[Cl-(CH_2-CH_2-O)_n-R-CH=]_m[(=N-)_mZ]$$

in which R represents an aromatic residue of the benzene series, $n$ is an integer from 1 to 3, $m$ is an integer from 1 to 2, and the structure $$[(=N-)_m \cdot Z]$$

represents the residue of a primary amine.

The amines to be reacted with the chloroethoxy aromatic aldehydes may be members of the aliphatic, arylaliphatic, cycloaliphatic, hydroxyaliphatic, alkylaromatic, alkoxyaromatic and heterocyclic series. Typical amines include methylamine, ethylamine, isopropylamine, butylamine, amylamine, octylamine, caprylamine, decylamine, dodecylamine, octodecenylamine, octodecylamine, ethylenediamine, propylenediamine, butylenediamine, ethanolamine, propanolamine, butanolamine, pentanolamine, hydroxypropylenediamine, hydroxybutylenediamine, hydroxyhexylenediamine, benzylamine, aniline, toluidine, xylidene, chloroaniline, nitroaniline, phenylaniline, cyclohexylamine, naphthylamine, phenylazoaniline, tertiarybutylaniline, anisidine, phenetidine, aminoantipyrene and diaminodiphenylmethane.

Typical chloroethoxy aromatic aldehydes which are suitable as starting materials include the following

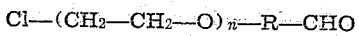
$$Cl-(CH_2-CH_2-O)_2-R-CHO$$
$$Cl-(CH_2-CH_2-O)_3-R-CHO$$
$$Cl-(CH_2-CH_2-O)_3-C_6H_4-CHO$$
$$Cl-(CH_2-CH_2-O)_2-C_6H_4-CHO$$
$$Cl-CH_2-CH_2-O-C_6H_4-CHO$$

In the above group of compounds, the aromatic nucleus, designated R in generic terms, may contain nuclear substituents such as alkyl, alkoxy and halogen.

The chloroethoxy aromatic aldehydes contain two groups which may react with primary amines, the halo and the aldehyde group. It has been found that the halo group, however, is of substantially lower reactivity than the aldehyde group, and that in the temperature range between about 10° and 125° C. the aldehyde group preferentially reacts with the amine with the elimination of water.

In practice, the reaction between the chloroethoxy aromatic aldehyde and primary amine is carried out at a temperature of from 10° to 125° C., the optimum temperature depending somewhat upon the particular reactants employed. If desired, the reaction may be performed in a solvent such as ethanol. Good results are obtained when one molecular proportion of the aldehyde is reacted with one molecular proportion of the primary monoamine or one-half molecular proportion of the primary diamine. Upon completion of the reaction, the desired product may be separated by conventional methods such as washing with dilute aqueous mineral acids, ethanol and water, fractional distillation and fractional crystallization.

The chloroethoxy aromatic aldehydes employed as starting materials, as above described, may be prepared by reacting ethylene chloride, 2,2'-dichlorodiethyl ether or 1,2-bis(2-chloroethoxy)-ethane with sodium hydroxide and a suitable hydroxy aromatic aldehyde. In carrying out the reaction, substantially equimolecular proportions of the reactants are mixed together in water as a reaction solvent and the resulting mixture heated at the boiling temperature of the reaction mixture and under reflux for a period of time to complete the reaction. The crude mixture is then fractionally distilled under reduced pressure to obtain the desired product.

The compounds of the present invention are oily liquids or crystalline solids somewhat soluble in many organic solvents, substantially insoluble in water, stable to light and air and non-corrosive to the skin of man and higher animals. They are valuable as intermediates for the preparation of more complex organic derivatives and as parasiticidal toxicants.

The following examples illustrate the compounds and method of the invention.

*Example 1.—N - (p - (2-chloroethoxy)benzylidene)propylamine*

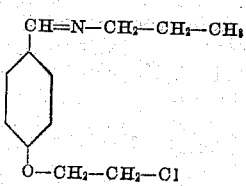

59 grams (1 mole) of normalpropylamine was added portionwise over a period of 5 minutes with stirring to 144 grams (0.785 mole) of p-(2-chloroethoxy)benzaldehyde (having a boiling point of 138° to 142° C. at 2 millimeters' pressure, a refractive index n/D of 1.5825 at 25° C., and a density of 1.2246 at 25° C.) dispersed in 200 milliliters of ethanol. During the addition, the temperature rose to 60° C. and was subsequently brought to 70° C. for one hour. The reaction mixture was then cooled to room temperature and fractionally distilled under reduced pressure to obtain N-(p-(2-chloroethoxy)benzylidene)-propylamine as an amber colored liquid. This product had a boiling point of 144° to 146° C., a freezing point of 3° to 6° C. and a chlorine content of 16.01 per cent. The theoretical chlorine content of $C_{12}H_{16}ClNO$ is 15.75 per cent.

*Example 2.—N-(p-(2-chloroethoxy)benzylidene)-p-phenylazoaniline*

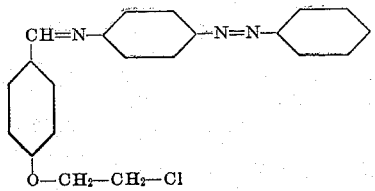

44 grams (0.223 mole) of 4-phenylazoaniline was dissolved in 300 milliliters of ethanol with stirring and warming at 50° C. 41 grams (0.223 mole) of p-(2-chloroethoxy)benzaldehyde was added to the above solution and the resulting mixture warmed for 2 hours with stirring at 78° C. and under reflux. This mixture was then cooled to room temperature, filtered and the filtrate allowed to stand in the cold. N-(p-(2-chloroethoxy)benzylidene) - p - phenylazoaniline was thereby precipitated out of solution as a brown crystalline solid. This product was recrystallized from 95 per cent ethanol and found to have a melting point of 140.5° to 141.5° C. and a nitrogen content of 11.3 per cent. The theoretical nitrogen content for $C_{21}H_{18}ClN_3O$ is 11.58 per cent.

*Example 3.—N-(o-(2-(2-chloroethoxy)ethoxy)-benzylidene)aniline*

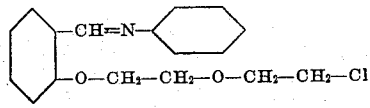

18.6 grams (0.2 mole) of aniline was added with stirring to 45.7 grams (0.2 mole) of o-(2-(2-chloroethoxy)ethoxy)benzaldehyde (having a boiling point of 183° to 185° C. at 5 millimeters' pressure, a refractive index n/D of 1.5453 at 20° C. and a specific gravity of 1.2136 at 20°/4° C.). The reaction proceeded rapidly at room temperature with the liberation of heat. Upon completion of the reaction, an emulsion which formed between the crude product and the water of reaction was broken by the addition of 25 milliliters of ethanol. The resulting mixture divided into aqueous and oil layers. The oil layer was separated to obtain N-(o-(2-(2-chloroethoxy)-ethoxy)benzylidene)aniline as a brown somewhat viscous oil.

*Example 4.—N-(p-(2-(2-chloroethoxy)ethoxy)benzylidene)aniline*

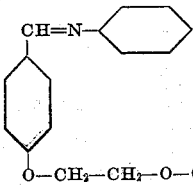

60 grams (0.263 mole) of p-(2-(2-chloroethoxy)ethoxy)benzaldehyde (melting at 65.5° to 66° C.) was dissolved in 500 milliliters of 95 per cent ethanol with stirring and warming to 55° C. 25 grams (0.27 mole) of aniline was added to the above solution and the resulting mixture heated for 2 hours at 78° C. and under reflux. Upon completion of the reaction, the crude product was diluted with water, the resulting mixture dividing into aqueous and oil layers. The latter was separated to obtain N-(p-(2-(2-chloroethoxy)-ethoxy)benzylidene)aniline as a brown oil having a density of 1.1298 at 25° C. and a refractive index n/D of 1.1298 at 25° C.

*Example 5.—N-(o-(2-(2-chloroethoxy)ethoxy)-benzylidene)-p-tertiaryamylaniline*

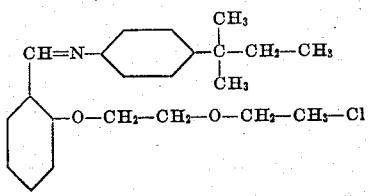

36 grams (0.22 mole) of p-tertiaryamylaniline was added with stirring to 50 grams (0.22 mole) of o-(2-(2-chloroethoxy)ethoxy)benzaldehyde. The reaction proceeded rapidly with the liberation of heat and formation of an aqueous emulsion. Following the reaction, the mixture was cooled to 2° C. whereby light tan crystals of N-(o - (2 - (2 - chloroethoxy)ethoxy)benzylidene)-p-tertiaryamylaniline precipitated from solution. This crystalline material was separated by filtration, washed with water and air dried to obtain a substantially pure product melting at 44° to 47° C. and having a nitrogen content of 3.67 per cent. The theoretical nitrogen content for $C_{22}H_{28}ClNO_2$ is 3.75 per cent. The above product was recrystallized from cyclohexane and found to melt at 46° to 48° C.

*Example 6.—N-(o-(2-(2-chloroethoxy)ethoxy)-benzylidene)-p-nitroaniline*

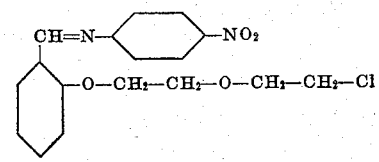

103 grams (0.451 mole) of o-(2-(2-chloroethoxy)ethoxy)benzaldehyde and 62.3 grams (0.451 mole) of p-nitroaniline were mixed together and warmed for 4 hours to obtain complete solution of the amine. The reaction mixture was then cooled to room temperature and the surface of the reaction vessel contacting the mixture locally roughened to provide centers for the growth of crystals. The mixture solidified upon standing at room temperature overnight. A light yellow crystalline powder was separated by filtration and recrystallized from acetone to obtain N - (o-(2-(2-chloroethoxy)ethoxy)benzylidene)-p-nitroaniline melting at 75° to 80° C.

Example 7.—N-(o-(2-(2-chloroethoxy)ethoxy)-benzylidene)-4-aminoantipyrene

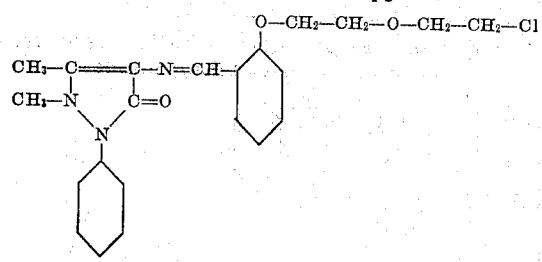

30.5 grams (0.15 mole) of 4-aminoantipyrene was dissolved in 50 milliliters of 95 per cent ethanol and the resulting solution added with stirring to 34.3 grams (0.15 mole) of o-(2-(2-chloroethoxy)ethoxy)benzaldehyde. The reaction was exothermic and proceeded rapidly with the precipitation of yellow crystals of N-(2-(2-(2-chloroethoxy)ethoxy)benzylidene) - 4 - aminoantipyrene. This product was separated by filtration, washed with ethanol and air dried to obtain 60.5 grams of a substantially pure material melting at 129.5°–131° C. and having a chlorine content of 8.5 per cent. The theoretical chlorine content of $C_{22}H_{24}ClN_3O_3$ is 8.59 per cent.

Example 8.—N-(p-(2-(2-chloroethoxy)ethoxy)benzylidene)-4-aminoantipyrene

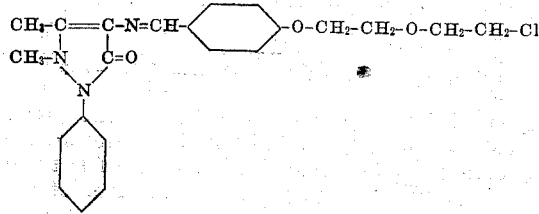

In a manner similar to that of Example 7, 30.5 grams (0.15 mole) of 4-aminoantipyrene dissolved in 50 milliliters of ethanol was reacted with 34.3 grams (0.15 mole) of p-(2-(2-chloroethoxy)ethoxy)benzaldehyde dissolved in 150 milliliters of ethanol. The reaction product was diluted with 100 milliliters of water, the resulting mixture dividing into aqueous and oil layers. The oil layer was separated and solidified with stirring to give pale yellow crystals of N-(p-(2-(2-chloroethoxy)ethoxy)benzylidene)-4-aminoantipyrene. This product was separated and washed with 50 per cent ethanol and air dried to obtain 56.5 grams of a substantially pure material melting at 110° to 111° C. and having a chlorine content of 8.5 per cent. The theoretical chlorine content of $C_{22}H_{24}ClN_3O_3$ is 8.59 per cent.

Example 9.—Bis[N - (o - (2 - (2 - chloroethoxy)-ethoxy)benzylidene)]-1,3-diamino-2-propanol

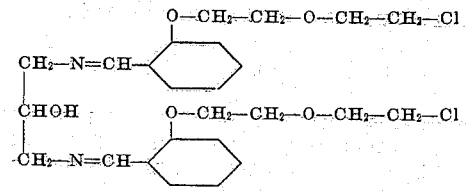

45.7 grams (0.21 mole) of o-(2-(2-chloroethoxy)ethoxy)benzaldehyde was added with stirring to 9.0 grams (0.1 mole) of 1,3-diamino-2-propanol dissolved in 50 millimeters of ethanol. The reaction was exothermic and took place rapidly. As a product from this reaction, there was obtained bis[N-(o-(2-(2-chloroethoxy)ethoxy)-benzylidene)]-1,3-diamino-2-propanol, as a viscous oil which upon warming changed to a dark brown sticky resin.

Example 10.—Bis[N - (p - (2 - (2-chloroethoxy)-ethoxy)benzylidene)]-1,3-diamino-2-propanol

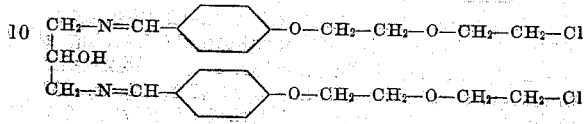

9.0 grams (0.1 mole) of 1,3-diamino-2-propanol dissolved in 15 milliliters of ethanol was added with stirring to 45.7 grams (0.21 mole) of p-(2-(2-chloroethoxy)ethoxy)benzaldehyde dissolved in 200 milliliters of ethanol and the resulting mixture allowed to react overnight at room temperature. The mixture, which partially solidified during this period, was then cooled at 2° C. for one hour, filtered, washed with dilute aqueous ethanol and dried to obtain as a white crystalline solid bis[N - (p - (2 - (2-chloroethoxy)ethoxy-benzylidene)]-1,3-diamino-2-propanol. The latter had a melting point of 83° to 84° C. and a nitrogen content of 5.66 per cent. The theoretical nitrogen content of $C_{25}H_{32}Cl_2N_2O_5$ is 5.48 per cent.

Example 11.—N-(p-(2-(2-chloroethoxy)ethoxy)-benzylidene)-p-anisidine

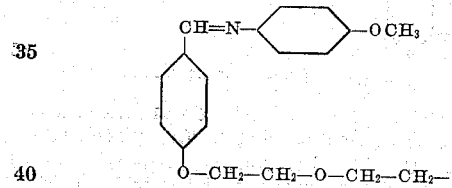

74 grams (0.6 mole) of p-anisidine was added portionwise over a period of 5 minutes with stirring to 114 grams (0.5 mole) of p-(2-(2-chloroethoxy)ethoxy)benzaldehyde dissolved in 950 milliliters of 95 per cent ethanol. The mixture was then heated at 78° C. for 2 hours and under reflux to complete the reaction. The vessel and contents were cooled in an ice bath for 10 minutes whereupon white crystals of N-(p-(2-(2-chloroethoxy)ethoxy)benzylidene)-p-anisidine precipitated from solution. This material was separated by filtration, washed with cold ethanol and dried to obtain a substantially pure product melting at 78.5°–79.5° C.

Example 12.—N-(p-(2-(2-chloroethoxy)ethoxy)-benzylidene)cyclohexylamine

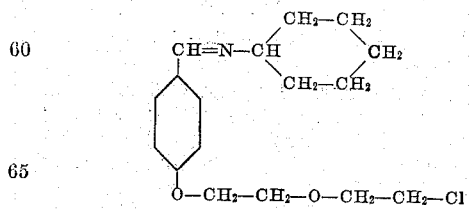

In a manner similar to that of Example 11, 59 grams (0.6 mole) of cyclohexylamine was reacted with 114 grams (0.5 mole) of p-(2-(2-chloroethoxy)ethoxy)benzaldehyde dissolved in 850 milliliters of ethanol. As a product of this reaction, there was obtained a high boiling brown viscous oil, N-(p-(2-(2-chloroethoxy)-ethoxy)benzylidene)-cyclohexylamine.

Example 13.—N,N'-bis(p-(2-(2-(2-chloroethoxy)ethoxy)ethoxy)-benzylidene)-4,4'-diaminodiphenyloxide.

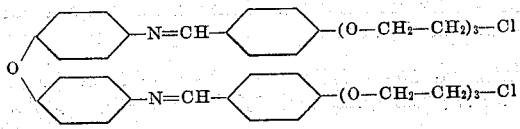

54.5 grams (0.2 mole) of p-(2-(2-(2-chloroethoxy)-ethoxy)ethoxy)benzaldehyde (having a boiling point of 225° to 230° C. at 6 millimeters' pressure, a refractive index n/D of 1.5422 at 25° C. and a specific gravity of 1.1972 at 25°/25° C.) was reacted with 20 grams (0.1 mole) of 4,4'-diamino-diphenyloxide. The mixture immediately solidified, was diluted with 50 milliliters of 95 per cent ethanol and warmed on a steam bath for several hours. After standing for three months, the crude reaction product was successively recrystallized from chlorobenzene and ethanol to obtain as a light brown crystalline compound, N,N'-bis(p-(2-(2-(2-chloroethoxy)-ethoxy)ethoxy)benzylidene) - 4,4' - diamino-diphenyloxide. The latter had a melting point of 169° to 170° C.

Example 14.—N-(4-(2-(2-chloroethoxy)ethoxy)-3-methoxy-benzylidene)-p-chloraniline

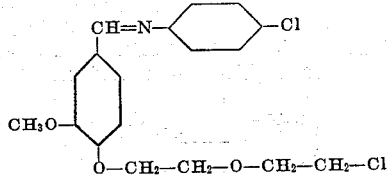

42 grams (0.325 mole) of 4-chloroaniline was added portionwise with stirring to 79 grams (0.3 mole) of 4-(2-(2-chloroethoxy)ethoxy)-3-methoxy benzaldehyde (melting at 54° to 55° C.) dissolved in 500 milliliters of 95 per cent ethanol. The temperature rose to 60° C. during the addition. The resulting mixture was heated for 2 hours at 78° C. and under reflux to complete the reaction. The crude mixture was then cooled to room temperature, filtered and the filtrate washed with cold ethanol and air dried. N-(4 - (2 - (2 - chloroethoxy - ethoxy) - 3 - methoxybenzylidene-p-chloroaniline was thereby obtained as a cream colored crystalline solid melting at 85.5° to 87° C. and having a chlorine content of 18.9 per cent. The theoretical chlorine content for $C_{18}H_{19}Cl_2NO_3$ is 19.3 per cent.

Example 15.—N-(2-(2-(2-chloroethoxy)ethoxy)-5-chlorobenzylidene)benzylamine

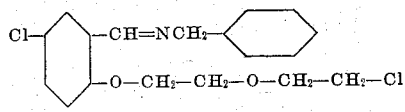

In a similar manner, 53 grams (0.5 mole) of benzylamine was reacted with 105 grams (0.4 mole) of 2 - (2 - (2 - chloroethoxy)ethoxy - 5 - chlorobenzaldehyde (having a boiling point of 180° to 182° C. at 2 millimeters' pressure, a refractive index n/D of 1.5540 at 25° C. and a density of 1.3034 at 25° C.) dissolved in 400 milliliters of 95 per cent ethanol. Following the reaction, the ethanol was removed by evaporation and the residue successively washed with dilute aqueous hydrochloric acid and water to obtain N - (2 - (2 - (2 - chloroethoxy)ethoxy - 5 - chorobenzylidene)benzylamine as a brown viscous oil. This product had a freezing point of −2° to 4° C. and a nitrogen content of 4.2 per cent. The theoretical nitrogen content for $C_{18}H_{19}Cl_2NO_2$ is 4.0 per cent.

Example 16.—N-(p-(2-(2-chloroethoxy)ethoxy)-benzylidene)-2-napththylamine

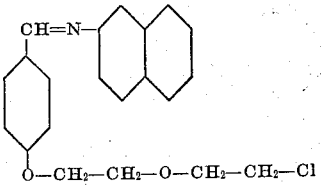

38 grams (0.264 mole) of 2-naphthylamine was added portionwise to 46 grams (0.2 mole) of p-(2-(2-chloroethoxy)-ethoxy)benzaldehyde dissolved in 400 milliliters of 95 per cent ethanol. The resulting mixture was heated for 2 hours at 78° C. and under reflux. The reaction vessel and contents were then cooled for ½ hour in an ice bath, the reaction mixture separating into aqueous and oil layers. The latter was separated and upon standing overnight slowly solidified to give light brown crystals of N-(p - (2 - chloroethoxy)ethoxy)benzylidene) - 2-naphthylamine melting at 53.5° to 55° C. and having a nitrogen content of 4.06 per cent. The theoretical nitrogen content for $C_{21}H_{20}ClNO_2$ is 3.97 per cent.

I claim:

1. A compound having the formula

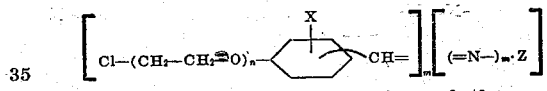

wherein X represents a member of the group consisting of hydrogen, alkoxy and halogen, the structure $(=N-)_m \cdot Z$ represents a substituted imino grouping in which Z is a member of the group consisting of the aliphatic, cycloaliphatic, arylaliphatic and nonacidic isocyclic aromatic radicals attached to the nitrogen through carbon, n is an integer from 1 to 3, inclusive, and m is an integer from 1 to 2, inclusive.

2. A compound having the formula

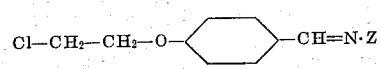

wherein the structure $=N \cdot Z$ represents a substituted imino grouping in which Z is a nonacidic isocyclic aromatic radical attached to the nitrogen through carbon.

3. A compound having the formula

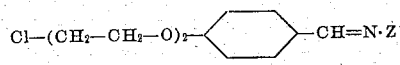

wherein the structure $=N \cdot Z$ represents a substituted imino grouping in which Z is a nonacidic isocyclic aromatic radical attached to the nitrogen through carbon.

4. A compound having the formula

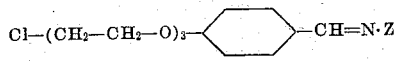

wherein the structure $=N \cdot Z$ represents a substituted imino grouping in which Z is a nonacidic isocyclic aromatic radical attached to the nitrogen through carbon.

5. A compound having the formula

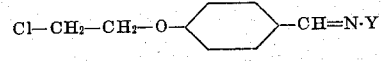

wherein the structure $=N \cdot Y$ represents a substituted imino grouping in which Y is an aliphatic radical.

6. A compound having the formula

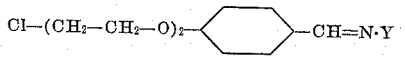

wherein the structure =N·Y represents a substituted imino grouping in which Y is an aliphatic radical.

7. A method of preparing a Schiff's base from a chloroethoxy aromatic aldehyde of the formula

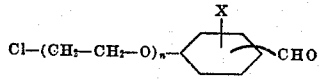

wherein X represents a member of the group consisting of hydrogen, alkoxy and halogen, and $n$ is an integer from 1 to 3, inclusive, which comprises reacting said aldehyde with an equivalent proportion of a primary amine of the formula $$Z \cdot (NH_2)_m$$

in which Z represents a member of the group consisting of the aliphatic, cycloaliphatic, arylaliphatic and nonacidic isocyclic aromatic radicals attached to the nitrogen through carbon, and $m$ represents an integer from 1 to 2 inclusive, the reaction being carried out at a temperature of from 10° to 125° C.

8. N-(p-(2-chloroethoxy)benzylidene) propylamine of the formula

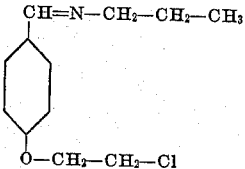

9. N-(p-(2-(2-chloroethoxy)ethoxy)benzylidene)-p-anisidine of the formula

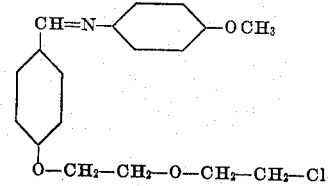

GERALD H. COLEMAN.

No references cited.